United States Patent [19]
Kryshtob

[11] Patent Number: 5,576,383
[45] Date of Patent: Nov. 19, 1996

[54] METHOD FOR PRODUCTION OF ANTISTATIC POLYMER MATERIALS

[76] Inventor: Vitaly I. Kryshtob, Mytnaya Ul., 52/54, 41, 113162 Moscow, Russian Federation

[21] Appl. No.: 384,124

[22] Filed: Feb. 6, 1995

[30] Foreign Application Priority Data

Jun. 7, 1993 [RU] Russian Federation ........ 93031290/05
Jun. 6, 1994 [WO] WIPO ...................... PCT/RU94/00122

[51] Int. Cl.$^6$ ................................ C08K 5/05; C08K 5/01
[52] U.S. Cl. ........................... 524/765; 524/768; 524/910
[58] Field of Search ............................ 524/121 D, 91 D, 524/390, 379, 317, 765, 768

[56] References Cited

U.S. PATENT DOCUMENTS

| | | |
|---|---|---|
| 3,594,222 | 7/1971 | Wells . |
| 3,745,116 | 7/1973 | Brindell et al. . |
| 3,875,082 | 4/1975 | Finck . |
| 5,346,959 | 9/1994 | Goman et al. ........................... 525/187 |

FOREIGN PATENT DOCUMENTS

| | | |
|---|---|---|
| 484238 | 8/1976 | U.S.S.R. . |
| 1390230 | 4/1988 | U.S.S.R. . |
| 1397459 | 5/1988 | U.S.S.R. . |
| 1645277 | 4/1991 | U.S.S.R. . |

OTHER PUBLICATIONS

USSR Ministry of Construction Materials Production, etc., "Standard Technological Regulations for Production . . . ".

*Primary Examiner*—Jeffrey T. Smith
*Attorney, Agent, or Firm*—Michael N. Meller

[57] ABSTRACT

A method for production of antistatic polymer materials which includes an introduction of antistatic agent in the form of a solution of the antistatic agent in an organic solvent, compatible during processing thereof is described. The antistatic agent is at least one compound from the group consisting of organic and inorganic salts, complex compounds and bases. The composition is processed at temperatures not exceeding the least of the boiling and decomposition temperatures of antistatic and solvent. An organic acid is additionally introduced into the composition. The organic solvents are glycols, esters and their derivatives.

6 Claims, No Drawings

METHOD FOR PRODUCTION OF ANTISTATIC POLYMER MATERIALS

FIELD OF THE INVENTION

The present invention relates to chemical technology and particularly, to methods for production of antistatic polymer materials by introducing antistatic additives into them. These materials can be utilized for production of various polymer coatings.

BACKGROUND OF THE INVENTION

It is common knowledge that a reduction of electrostatic polarization of polymer coatings provides an improvement of environmental conditions for human activity. Therefore, a considerable number of inventions are aimed at the development of methods for improving the antistatic characteristics of polymer materials.

One of the most widely used methods for reducing the static electricity of polymer materials and compositions based thereon, is to introduce antistatic agents into these materials.

Particularly known in the art is a method for reducing static electricity of polymer materials by the introduction of various amine derivatives into these materials (SU,A, 484238).

However, use of nitrogen-containing additives in said prior art has an adverse effect upon the thermal stability of polymer materials, and coatings based thereon, for example, floor coatings, possess low antistatic properties.

Also known in the art is a method for production of antistatic polymer composition by introduction into a polymer composition during processing thereof of the antistatic agent Syntamide-5 (Standard Technological Regulation for Polyvinyl Chloride Linoleum Production, All-Union Research and Design Institute for Polymer Construction Material, Moscow, 1986, pp. 6, 44).

The basic disadvantage of said prior art is an essentially limited antistatic effect achieved by the use thereof. This is caused by the fact that an insufficient quantity of antistatic agent does not ensure appropriate antistatic properties, whereas the excessive introduction of Syntamide-5 into a composition results in a high "sweating out" of the antistatic agent and reduces the processability of said composition.

The closest prior art with respect to the present invention is a method for production of antistatic polymer materials, including an introduction of an antistatic agent in a form of an antistatic agent solution into a polymer composition during processing thereof (SU,A,1390230). In said prior art, the antistatic agents are aqueous solutions of substances capable to hydrate water of crystallization in a solid state. Such substances can be solid conductive mineral filling agents.

Said prior art allows one to produce polymer coatings possessing sufficiently high antistatic properties. However, application of said coatings is limited by the fact that only a narrow class of substances, capable to hydrate water of crystallization in solid state, can be used as an antistatic agent. In addition, the release of water from a polymer composition at the stage of thermal processing thereof, and establishment of an aggressive vapour environment result in a quick corrosive wear of the equipment.

SUMMARY OF THE INVENTION

The main object of the present invention is to reduce the corrosive wear of equipment while maintaining antistatic and physical and mechanical properties of the materials produced.

A further object of the invention is to extend a range of substances utilized as antistatic agents and to provide an improvement of decorative properties of antistatic materials produced (including production of transparent polymer coatings).

Said object is attained by a method for production of antistatic polymer materials, including the introduction of an antistatic agent in the form of a solution into a polymer composition during the processing thereof, wherein a solution of antistatic agent in an organic solvent is used, compatible with the polymer matrix, the antistatic agent being at least one compound from the group consisting of organic salts, inorganic salts, complex compounds, bases; the composition being processed at temperatures not exceeding the least of the temperatures $T_{p1}$, $T_{p2}$, $T_{k1}$, $T_{k2}$, where $T_{p1}$ and $T_{p2}$ are antistatic and solvent decomposition temperatures, and $T_{k1}$ and $T_{k2}$ are antistatic and solvent boiling temperatures respectively.

Alternatively, according to the present invention, an organic acid is additionally introduced into the solution of the antistatic agent.

Also, according to the invention, the solutions of antistatic agent are homogeneous solutions.

Additionally, the organic solvent is at least one compound from the group consisting of glycols, esters and derivatives thereof.

The present invention differs from the closest prior art by the fact that an antistatic compound is used in a form of a solution of the antistatic compound in a high-boiling organic solvent, compatible with a polymer matrix. The term "compatible" is intended to imply an absence of boiling away and decomposition of the antistatic agent during the composition processing and production of polymer materials under the process temperature ranges mentioned above. This allows one to considerably reduce the release of an aggressive medium, i.e., antistatic agent, from a polymer matrix during its processing, while maintaining high antistatic characteristics of the polymer materials being produced, thus providing a reduction of corrosive wear on the equipment.

Owing to elimination of the evaporization losses, inherent in the closest prior art during water-vapour phase transition, the method according to the present invention ensures a reduction of energy consumption per product unit, with other conditions being equal.

The advantages of the present invention will become clearer from the following description of the examples which implement the invention.

EXAMPLE 1

A polymer composition is prepared by mixing, at ambient temperature, the following components, taken in parts by weight:

| | |
|---|---|
| polyvinyl chloride suspension (ПВХ - C-70), i.e., PUK-C-70 | 100 |
| di-(2-ethylhexyl)-phenylphosphate (ДАФ), i.e., DAPH triethylene glycol dicaprylate | 20 40 |
| (ТЖ KK-79), i.e., Tzk-79 chrysotile asbestos (7-450 grade) Antistatic agent: | 75 |
| $LiNO_3$ | 0.7 |
| tetraethylene glycol | 3.5 |

Before introduction of $LiNO_3$ into the composition, it is dissolved in tetraethylene glycol to obtain a homogeneous (clear) solution.

Film specimens are produced by rolling through rollers at temperature 150° C. during 5 min.

EXAMPLE 2

This Example differs from Example 1 by the fact that before mixing with tetraethylene glycol there are additionally introduced 2 parts by mass of potassium salt of di-(alkyl polyethylene glycol) ester of phosphorus acid having the following structural formula:

$$[RO(CH_2CH_2O)_n]_2P\begin{matrix}\nearrow O \\ \searrow OK^-\end{matrix}, \text{ where}$$

R is alkyl group containing 8–10 atoms of carbon, with an average value of n being 6.

EXAMPLE 3

A composition is prepared by mixing at ambient temperature the following components, taken in parts by weight:

| | |
|---|---|
| ПВХ - С-70, ie., PUK-C-70 (polyvinyl chloride suspension) | 100 |
| dioctylphthalate (ДОФ), i.e., DOPH | 40 |
| trichlorethyl phosphate | 15 |
| chrysotile asbestos (grade 7-450) | 75 |
| Antistatic agent: | |
| hexahydrate magnesium bromide $MgBr_2\text{-}6H_2O$ | 1.0 |
| dimethyl diethylene glycol ester | 7.0 |

Prior to mixing the components, $MgBr_2$—$6H_2O$ is dissolved under agitation in dimethyl diethylene glycol ester to obtain a homogeneous (clear) solution.

The film samples are obtained by rolling through rollers at temperature 140° C. for three minutes.

EXAMPLE 4

A composition is prepared by mixing at ambient temperature the following components, taken in parts by weight:

| | |
|---|---|
| ПВХ - С-70, i.e., PUK-C-70 (polyvinyl chloride suspension) | 100 |
| ДАФФ, i.e., DAPH (di-(2-ethylhexyl)phenyl phosphate) | 35 |
| triethylene glycol dicaprylate | 15 |
| Antistatic agent | |
| lithium chloride (LiCl) | 0.8 |
| triethylene glycol monoethyl ester | 7.0 |

Prior to mixing of the components, LiCl is dissolved under agitation in triethylene glycol monoethyl ester to produce a homogeneous (clear) solution.

The film samples are obtained by rolling through rollers at temperature 155° C. for five minutes.

EXAMPLE 5

This Example differs from Examples above by using ethylene-propylene rubber (СКЭПТ, i.e., SKEPT grade grade) as a polymer matrix (a binder), instead ПВХ, i.e., PUK.

A composition is prepared by mixing at ambient temperature of the following components, taken in parts by weight:

| | |
|---|---|
| ethylene-propylene rubber(grade СКЭПТ) i.e., SkepT | 100 |
| chalk | 25 |
| kaolin | 25 |
| potassium bromide | 0.8 |

The film samples are obtained by rolling through rollers under the following conditions:

| | |
|---|---|
| rubber plasticization at rollers at ambient temperature | 10 min |
| introduction, under agitation, of filling agents (chalk, kaolin) and potassium bromide | 10 min |
| temperature of rollers at the moment of cutting off the material web | 30° C. |

EXAMPLE 6

Differs from Example 6 by introduction of 7 parts of glycerin by weight, instead of potassium bromide (KBr), at the stage of filling agent introduction.

EXAMPLE 7

Differs from Example 6 by addition of 0.8 parts of potassium bromide by weight to the composition.

Prior to introduction to the composition, potassium bromide is dissolved, under agitation, in glycerin to obtain a homogeneous (clear) solution.

In the Examples above, the antistatic agent is produced under agitation at a temperature with the range of from 80° C. to 100° C.

EXAMPLE 8

In this Example, characteristics of a method for production of antistatic polymer composition, including an introduction of Syntamide-5 into a polymer matrix are given for comparison.

A composition is prepared by mixing, at ambient temperature, the following components, taken in parts by mass:

| | |
|---|---|
| ПВХ - С-70, i.e., PUK-C-70 | 100 |
| ДОФ, i.e., DOPH | 50 |
| chrysotile asbestos (grade 7-450) | 100 |
| Syntamide-5 | 0.8 |

The Syntamide-5 formula is $$[C_nH_{2n+1}CONHC_2H_4O(C_2H_4O)_mH],$$

where n=8–18; m=5–6.

The film samples are produced by rolling through rollers at temperature 150° C. for five minutes.

EXAMPLE 9

A composition prepared has the following content, expressed in parts by weight:

| | |
|---|---|
| ПВХ - C-70, i.e., PUK-C-70 | 100 |
| ДО Ф, i.e., DOPH | 30 |
| Antistatic agent: | |
| potassium hexafluorophosphate ($KPF_6$) | 1.0 |
| triethylene glycol diethyl ester | 5.0 |
| trichloroethyl phosphate | 10.0 |

Liquid stabilizer of polyvinyl chloride compositions, e.g., (Ba—Zn) 2.0

Prior to mixing the components, $KPF_6$ is dissolved in a mixture of triethylene glycol diethyl ester and trichloroethyl phosphate under heating at approximately 80°–100° C. and agitation to obtain a homogeneous (clear) solution.

The film samples are produced by rolling through rollers at temperature 180° C. for five minutes.

This Example illustrates a utilization of a complex substance in the antistatic agent.

EXAMPLE 10

This Example differs from Example 9 by using an organic salt, such as trifluoromethane sulphonyl lithium ($CF_3SO_3Li$), as an antistatic agent.

EXAMPLE 11

A composition prepared has the following content, expressed in parts by mass:

| | |
|---|---|
| ПВХ - C-70, i.e., PUK-C-70 | 100 |
| ДО Ф, i.e., DOPH | 35 |
| Antistatic agent | |
| trioctylamine | 2.0 |
| trichloroethyl phosphate | 12.0 |
| Liquid stabilizer | |
| (Ba-Zn) | |

Prior to mixing the components, trioctylamine is dissolved in trichloroethyl phosphate at ambient temperature to obtain a homogeneous solution.

The film samples are produced by rolling through rollers at temperature 150° C. for five minutes.

EXAMPLE 12

A composition prepared has the following content, expressed in parts by weight:

| | |
|---|---|
| ПВХ - C-70, i.e., PUK-C-70 | 100 |
| ДО Ф, i.e., DOPH | 30 |
| Antistatic agent | |
| trifluoromethane sulphonic acid ($CF_3SO_3H$) | 1.5 |
| lithium chloride (LiCl) | 0.4 |
| trichloroethyl phosphate | 10.0 |
| triethylene glycol diethyl ester | 3.0 |
| Liquid stabilizer | |
| (Ba-Zn) | 1.0 |

Prior to mixing the components, trifluoromethane sulphonic acid and lithium chloride are dissolved in a mixture of triethylene glycol diethyl ester and trichloroethyl phosphate under heating at approximately 100° C. and agitation to obtain a homogeneous clear solution.

EXAMPLE 13

A polymer composition is prepared according to the closest prior art, by mixing at ambient temperature of the following components, taken in parts by mass:

| | |
|---|---|
| ПВХ - C-70, i.e., PUK-C-70 | 100 |
| ДО Ф, i.e., DOPH | 45 |
| sifted chalk | 60 |
| Antistatic agent | |
| potassium carbonate ($K_2CO_3$) | 15 |
| distilled water | 30 |
| Liquid stabilizer | |
| (Ba-Zn) | 1.5 |

Prior to mixing the components, $K_2CO_3$ is dissolved in distilled water at ambient temperature.

The film samples are produced by rolling through rollers at temperature 125° C. for five minutes.

Specific surface resistivity of the resulting antistatic polymer materials was defined using flat, circular (diameter 50 mm) samples of film having a thickness of 0.2–1.5 mm in accordance with standard ГОСТ, i.e. GOST 6433.2-71 "Methods of Defining Resistivity under Direct Voltage".

The tests were conducted using the instrument ТЕ$\text{AOMMT}_\text{р}^\text{D}$ (teraommeter) E-13A. A number of samples in each test was not less than 3.

Results of testing the film samples are given in Table below.

TABLE

| Antist. agent m.p▲ per 100 m.p of polymer matrix (antistic N agent. incl.) ▲(mass parts) | Antistatic agent | Boiling (decomp) t° of antistatic agent (°C.) | Solvent | Solvent boiling (decomp) t° (°C.) | Max. process t° (°C.) | Specif. resist. of materials (om) |
|---|---|---|---|---|---|---|
| 1  4.2 (0.7) | LiNO₃ | 254 | H(—OCH₂CH₂—)₄OH | 327.3 | 150 | 3.2 10¹⁰ |
| 2  6.2 (2.7) | mixture of LiNO₃ with potassium di-alkyl polyethylene glycol ester sulfonate* | 254 | H(—OCH₂CH₂—)₄OH | 327.3 | 150 | 8.1 10⁸ |
| 3  8.0 (1.0) | MgBr₂ 6H₂O | 165 | (CH₃OCH₃CH₂)₂O | 162 | 140 | 2.7 10⁸ |
| 4  7.8 (0.8) | LiCl | 610 | C₂H₅O(C₂H₄O)₃H | 255.4 | 155 | 4.1 10¹⁰ |
| 5  0.8 (0.8) | KBr | 730 | — | — | 30 | 3.1 10¹¹ |
| 6  7.0 (0) | — | — | HOCH₂CH(OH)CH₂OH | 290 | 30 | 1.3 10⁸ |
| 7  7.8 (0.8) | KBr | 730 | HOCH₂CH(OH)CH₂OH | 290 | 30 | 3.3 10⁸ |
| 8  8.0 (8.0) | Syntamide-5** | — | — | — | 150 | 4.1 10¹² |
| 9  16.0 (1.0) | KPF₆ | >250 | mixture of C₂H₅O(C₂H₄O)₃C₂H₅ with (Cl CH₂CH₂O)₃PO | >250 | 180 | 1.4 10¹¹ |
| 10  16.0 (1.0) | CF₃SO₃Li | >250 | mixture of C₂H₅O(C₂H₄O)₃C₂H₅ with (Cl CH₂CH₂O)₃PO | >250 | 180 | 1.1 10¹¹ |
| 11  14.0 (2.1) | (C₈H₁₇)₃N | >250 | (ClCH₂CH₂O)₃PO | >250 | 150 | 8.4 10¹¹ |
| 12  14.9 (1.9) | mixture of LiCl with CF₃SO₃H | >250 | mixture of C₂H₅O(C₂H₄O)₃C₂H₅ with (Cl CH₂CH₂O)₃PO | >250 | 150 | 5.1 10¹¹ |
| 13  45.0 (15) | K₂CO₃ | >250 | H₂O | 100 | 125 | 4.8 10¹¹ |

*structural formula:

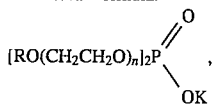

where R is alkyl group containing 8–10 atoms of carbon; an average value of n is 6.

**structural formula: [C$_n$H$_{2n+1}$CONHC₂H₄O(C₂H₄O)$_m$H], where n = 8–18, m = 5–6.

Samples of Test 13 resulted in a considerable corrosion of the surfaces of processing shafts. The remaining tests did not demonstrate such effects.

From Table above, it is obvious that an implementation of the present invention ensures high antistatic properties of the resulting polymer materials for various polymer types. The significant feature is that an aggressive, corrosive vapour atmosphere is not established, and, therefore, a corrosive wear of equipment is reduced.

The invented distribution of an antistatic agent in a polymer matrix at a molecular level (owing to use of homogeneous, clear solutions of antistatic agent) provides a possibility to produce polymer coatings having improved antistatic properties (including clear ones, i.e., without a filling agent).

The organic solvents can be tetraethylene glycol, triethylene glycol monoethyl ester, diethylene glycol dimethyl ester, triethylene glycol diethyl ester, trichloroethyl phosphate or combinations thereof.

The antistatic agents can be, for instance, potassium bromide, magnesium bromide, lithium nitrate, lithium chloride, lithium trifluoromethane sulfonate, potassium hexafluorophosphate, trioctylamine, and combinations thereof.

The organic acid, additionally introduced into the composition, can be, for example, trifluoromethane sulphonic acid.

INDUSTRIAL APPLICABILITY

The present method for production of antistatic polymer materials can be most successfully utilized in chemical and petroleum chemical technologies for production of antistatic polymer coatings.

I claim:

1. A method for producing antistatic polymer materials, comprising the steps of:
   (a) incorporating into a polymer matrix, during its processing, an antistatic agent in a form of a homogeneous solution consisting of an antistatic compound in an organic solvent, said solution being compatible with the polymer matrix;
   (b) processing the composition at temperatures not exceeding the least of the temperatures: $T_{p1}$, $T_{p2}$, $T_{k1}$, $T_{k2}$ where $T_{p1}$ and $T_{p2}$ are decomposition temperatures of the antistatic and solvent, and $T_{k1}$ and $T_{k2}$ are boiling points of the antistatic and solvent, respectively,
   (c) said antistatic compound being at least one compound selected from the group consisting of organic salts, inorganic salts, complex compounds and bases.

2. A method as set forth in claim 1, wherein an organic acid is added to said solution of an antistatic agent.

3. A method as set forth in claim 1, wherein said organic solvent is at least one compound selected from the group consisting of glycols, esters and their derivatives.

4. A method as set forth in claim 1, wherein said antistatic compound is at least one compound selected from the group consisting of potassium bromide, magnesium bromide, lithium nitrate, lithium chloride, lithium trifluoromethane sulphonate, potassium hexafluorophosphate, potassium salt of di-(alkylpolyethylene glycol) ester of phosphorus acid, and trioctylamine.

5. A method as set forth in claim 2, wherein said organic acid is trifluoromethane sulphonic acid.

6. A method as set forth in claim 3, wherein said organic solvent is at least one compound selected from the group consisting of tetraethylene glycol, monoethyl ester, triethylene glycol, diethyl glycol dimethyl ester, triethylene glycol diethyl ester, and trichlorophosphate.

* * * * *